(12) United States Patent
Magazine

(10) Patent No.: US 10,715,616 B2
(45) Date of Patent: Jul. 14, 2020

(54) PERIPHERAL DEVICE IMPLEMENTATION SYSTEM AND ASSOCIATED METHODS

(71) Applicant: Walmart Apollo, LLC, Bentonville, AR (US)

(72) Inventor: Rohit Magazine, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 296 days.

(21) Appl. No.: 15/435,699

(22) Filed: Feb. 17, 2017

(65) Prior Publication Data

US 2017/0244800 A1 Aug. 24, 2017

Related U.S. Application Data

(60) Provisional application No. 62/298,527, filed on Feb. 23, 2016.

(51) Int. Cl.
*H04L 29/08* (2006.01)
*H04N 1/00* (2006.01)
*H04N 1/327* (2006.01)

(52) U.S. Cl.
CPC .......... *H04L 67/2823* (2013.01); *H04L 67/10* (2013.01); *H04N 1/00344* (2013.01);
(Continued)

(58) Field of Classification Search
CPC . H04L 67/2823; H04L 67/10; H04N 1/00344; H04N 1/32771;
(Continued)

(56) References Cited

U.S. PATENT DOCUMENTS

| 7,011,462 | B2 | 3/2006 | Hanaoka |
| 7,839,521 | B2 | 11/2010 | Bard et al. |

(Continued)

FOREIGN PATENT DOCUMENTS

WO 2013052641 A2 4/2013

OTHER PUBLICATIONS

International Search Report and Written Opinion from related International Patent Application No. PCT/US2017/018281 dated May 8, 2017.

(Continued)

*Primary Examiner* — Brian J. Gillis
*Assistant Examiner* — Juan C Turriate Gastulo
(74) *Attorney, Agent, or Firm* — McCarter & English, LLP; David R. Burns

(57) ABSTRACT

An example peripheral device implementation system and associated methods are described. The example peripheral device implementation system includes a central database, a peripheral service including a peripheral service interface, a communication platform, non-transitory computer-readable medium, and a processing device. The processing device can be configured to establish communication between a cloud environment and the central database, the peripheral service, and a client device. The processing device can be configured to establish communication between a peripheral device and the cloud environment, and automatically perform a self-registration of the peripheral device to the cloud environment. Using the processing device, the client device can be notified of communication with the peripheral device, and a first request can be electronically transmitted from the client device to the cloud environment, from the cloud environment to the peripheral service, and from the peripheral service to the peripheral device to perform a function with the peripheral device.

18 Claims, 9 Drawing Sheets

(52) U.S. Cl.
 CPC ..... *H04N 1/32771* (2013.01); *H04N 1/32776* (2013.01); *H04N 2201/0081* (2013.01); *H04N 2201/0082* (2013.01); *H04N 2201/0084* (2013.01)

(58) Field of Classification Search
 CPC ... H04N 2201/0081; H04N 2201/0082; H04N 2201/0084; H04N 1/32776
 See application file for complete search history.

(56) References Cited

U.S. PATENT DOCUMENTS

| | | | |
|---|---|---|---|
| 8,767,241 B2 | 7/2014 | Pan et al. | |
| 8,832,340 B2 | 9/2014 | Miyachi et al. | |
| 8,854,669 B1* | 10/2014 | Jazayeri | G06F 3/1204 358/1.15 |
| 2004/0054962 A1* | 3/2004 | Shima | G06F 21/608 715/274 |
| 2011/0087726 A1 | 4/2011 | Shim et al. | |
| 2011/0235085 A1* | 9/2011 | Jazayeri | G06F 3/1204 358/1.14 |
| 2013/0135665 A1 | 5/2013 | Griffith et al. | |
| 2013/0163027 A1 | 6/2013 | Shustef | |
| 2013/0293924 A1* | 11/2013 | Armstrong | G06F 3/1205 358/1.15 |
| 2015/0126115 A1* | 5/2015 | Yun | H04L 63/0492 455/41.1 |
| 2016/0283168 A1* | 9/2016 | Osadchyy | G06F 3/1205 |
| 2016/0328187 A1* | 11/2016 | Nathani | H04W 4/02 |

OTHER PUBLICATIONS

Cloud Printing: Secure Mobile Printing from Any Device, http://www.breezy.com/architecture/secure-cloud-printing-architecture.html, viewed Jan. 5, 2016.
Google Cloud Print, http://www.papercut.com/tour/google-cloud-print/, viewed Jan. 5, 2016.
Brochure, Boost your business: Become a Public Print Location, Hewlett-Packard Development Company, L.P., Feb. 2013.

\* cited by examiner

PERIPHERAL DEVICE IMPLEMENTATION SYSTEM AND ASSOCIATED METHODS

CROSS-REFERENCE TO RELATED APPLICATIONS

This application claims the benefit of commonly assigned U.S. Provisional Patent Application No. 62/298,527, which was filed on Feb. 23, 2016. The entire content of the foregoing provisional patent application is incorporated herein by reference.

BACKGROUND

Some business or retail establishments provide a service to customers via a computing device connected to one or more peripheral devices (e.g., printers, scanners, cameras, or the like). Generally, the peripheral device, such as a camera or printer, is hardwired to a computing device. If a problem occurs with a peripheral device and/or a computing device hardwired to the peripheral device, the customer generally has to wait until the problem is corrected before their task can be completed using the peripheral device. Lengthy wait times for correction of technical issues can result in a negative experience for the customer.

SUMMARY

Exemplary embodiments of the present disclosure provide a peripheral device implementation system that allows for interaction between client devices and peripheral devices through a cloud environment and a peripheral service. In particular, the peripheral device implementation system allows for a client device to electronically transmit a request for performing a function with a selected peripheral device without the need to hardwire the client device to the peripheral device. Even if technical issues occur at a particular peripheral device or computing device, the cloud environment and the peripheral service described herein provide a means for performing the desired functions with alternative peripheral devices available to the client device, even if they are not hardwired to the peripheral device.

In accordance with embodiments of the present disclosure, an exemplary peripheral device implementation system is provided. The peripheral device implementation system can include a central database, a peripheral service, a communication platform, a non-transitory computer-readable medium, and a processing device. The peripheral service can include a peripheral service interface. The processing device can be configured to execute instructions stored in the non-transitory computer-readable medium to, via the communication platform, establish communication between a cloud environment and the central database, the peripheral service, and a client device. The processing device can be configured to execute instructions stored in the non-transitory computer-readable medium to establish communication between at least one peripheral device and the cloud environment via the peripheral service interface, and automatically perform a self-registration of the at least one peripheral device to the cloud environment via the peripheral service interface.

The processing device can be configured to execute instructions stored in the non-transitory computer-readable medium to notify the client device of communication of the at least one peripheral device with the cloud environment via the communication platform. The processing device can be configured to execute instructions stored in the non-transitory computer-readable medium to electronically transmit a first request from the client device to the cloud environment via the communication platform regarding performing a function with the at least one peripheral device. The processing device can be configured to execute instructions stored in the non-transitory computer-readable medium to electronically transmit the first request from the cloud environment to the peripheral service via the peripheral service interface. The processing device can be configured to execute instructions stored in the non-transitory computer-readable medium to electronically transmit the first request from the peripheral service to the at least one peripheral device via the peripheral service interface to initiate performing the function with the at least one peripheral device.

The communication platform can be configured to provide communication between the client device and the at least one peripheral device without loading a driver of the at least one peripheral device to the client device or the cloud environment. In some embodiments, the processing device can be configured to execute instructions stored in the non-transitory computer-readable medium to communicate driver information associated with the at least one peripheral device between the peripheral device and the client device via communication between the peripheral service interface and the cloud environment, and via communication between the communication platform of the cloud environment and the client device. In some embodiments, the client device can be at least one of a tablet, a mobile phone, a personal computer, a handheld mobile device, a wearable mobile device, combinations thereof, or the like.

The processing device can be further configured to execute instructions stored in the non-transitory computer-readable medium to electronically store to the central database data (such as but not limited to membership data, print data, scan data, image data, or any combination thereof, or the like) associated with the client device. The processing device can be further configured to execute instructions stored in the non-transitory computer-readable medium to store registration data associated with the at least one peripheral device in a central registration module. The central registration module can be connected to the cloud environment via the communication platform.

In some embodiments, the at least one peripheral device can be at least one of a printer, a scanner, a camera, combinations thereof, or the like. The processing device can be further configured to execute instructions stored in the non-transitory computer-readable medium to associate a first abstraction layer with the client device. The processing device can be further configured to execute instructions stored in the non-transitory computer-readable medium to associate a second abstraction layer with the communication platform of the cloud environment. The processing device can be further configured to execute instructions stored in the non-transitory computer-readable medium to a third abstraction layer with the peripheral service interface of the peripheral service. The processing device can be further configured to execute instructions stored in the non-transitory computer-readable medium to associate a fourth abstraction layer with the at least one peripheral device. The first, second, third and fourth abstraction layers can provide levels of security between the client device, the communication platform of the cloud environment, the peripheral service interface of the peripheral service, and the at least one peripheral device.

The processing device can be further configured to execute instructions stored in the non-transitory computer-readable medium to notify the client device of additional peripheral devices communicating with the cloud environment via the communication platform. The processing device can be further configured to execute instructions stored in the non-transitory computer-readable medium to limit the additional peripheral devices provided to the client device as communicating with the cloud environment based on a client device location. The client device location can be limited by a distance of the client device relative to the additional peripheral devices. In some embodiments, the client device location can be limited by a structure in which the client device is located.

In accordance with embodiments of the present disclosure, an exemplary non-transitory computer-readable medium storing instructions that are executable by a processing device is provided. Execution of the instructions by the processing device can cause the processing device to, via a communication platform, establish communication between a cloud environment and a central database, a peripheral service, and a client device. Execution of the instructions by the processing device can cause the processing device to establish communication between at least one peripheral device and the cloud environment via a peripheral service interface of the peripheral service, and automatically perform a self-registration of the at least one peripheral device to the cloud environment via the peripheral service interface.

Execution of the instructions by the processing device can cause the processing device to notify the client device of communication of the at least one peripheral device with the cloud environment via the communication platform. Execution of the instructions by the processing device can cause the processing device to electronically transmit a first request from the client device to the cloud environment via the communication platform regarding performing a function with the at least one peripheral device. Execution of the instructions by the processing device can cause the processing device to electronically transmit the first request from the cloud environment to the peripheral service via the peripheral service interface. Execution of the instructions by the processing device can cause the processing device to electronically transmit the first request from the peripheral service to the at least one peripheral device via the peripheral service interface to initiate performing the function with the at least one peripheral device.

In some embodiments, the communication platform can be configured to provide communication between the client device and the at least one peripheral device without locating a driver of the at least one peripheral device to the client device or the cloud environment. Execution of the instructions by the processing device can cause the processing device to associate individual abstraction layers with at least one of the client device, the cloud environment, the peripheral service interface, or the at least one peripheral device. Execution of the instructions by the processing device can cause the processing device to notify the client device of additional peripheral devices communicating with the cloud environment via the communication platform. Execution of the instructions by the processing device can cause the processing device to limit the additional peripheral devices provided to the client device as communicating with the cloud environment based on a client device location.

In accordance with embodiments of the present disclosure, an exemplary method of implementing peripheral devices is provided. The method can include establishing communication between a cloud environment and a central database, a peripheral service, and a client device via a communication platform. The method can include establishing communication between at least one peripheral device and the cloud environment via a peripheral service interface of the peripheral service, and automatically performing of the self-registration of the at least one peripheral device to the cloud environment via the peripheral service interface.

The method can include notifying the client device of communication of the at least one peripheral device with the cloud environment via the communication platform. The method can include electronically transmitting a first request from the client device to the cloud environment via the communication platform regarding performing a function with the at least one peripheral device. The method can include electronically transmitting the first request from the cloud environment to the peripheral service via the peripheral service interface. The method can include transmitting the first request from the peripheral service to the at least one peripheral device via the peripheral service interface to initiate performing the function with the at least one peripheral device.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed peripheral device implementation system and associated methods, reference is made to the accompanying figures, wherein.

DETAILED DESCRIPTION

Exemplary embodiments of the present disclosure overcome the disadvantages of many conventional business or retail establishments by providing for a peripheral device implementation system that allows for interaction between client devices and peripheral devices through a cloud environment and a peripheral service. In particular, the peripheral device implementation system allows for a client device to electronically transmit a request of performing a function with a selected peripheral device without the need to hardwire the client device to the peripheral device. Thus, even if technical issues occur at the peripheral device or the computing device, the cloud environment and the peripheral service provide a means for performing the desired functions with alternative peripheral devices available to the client device.

Figure 1:
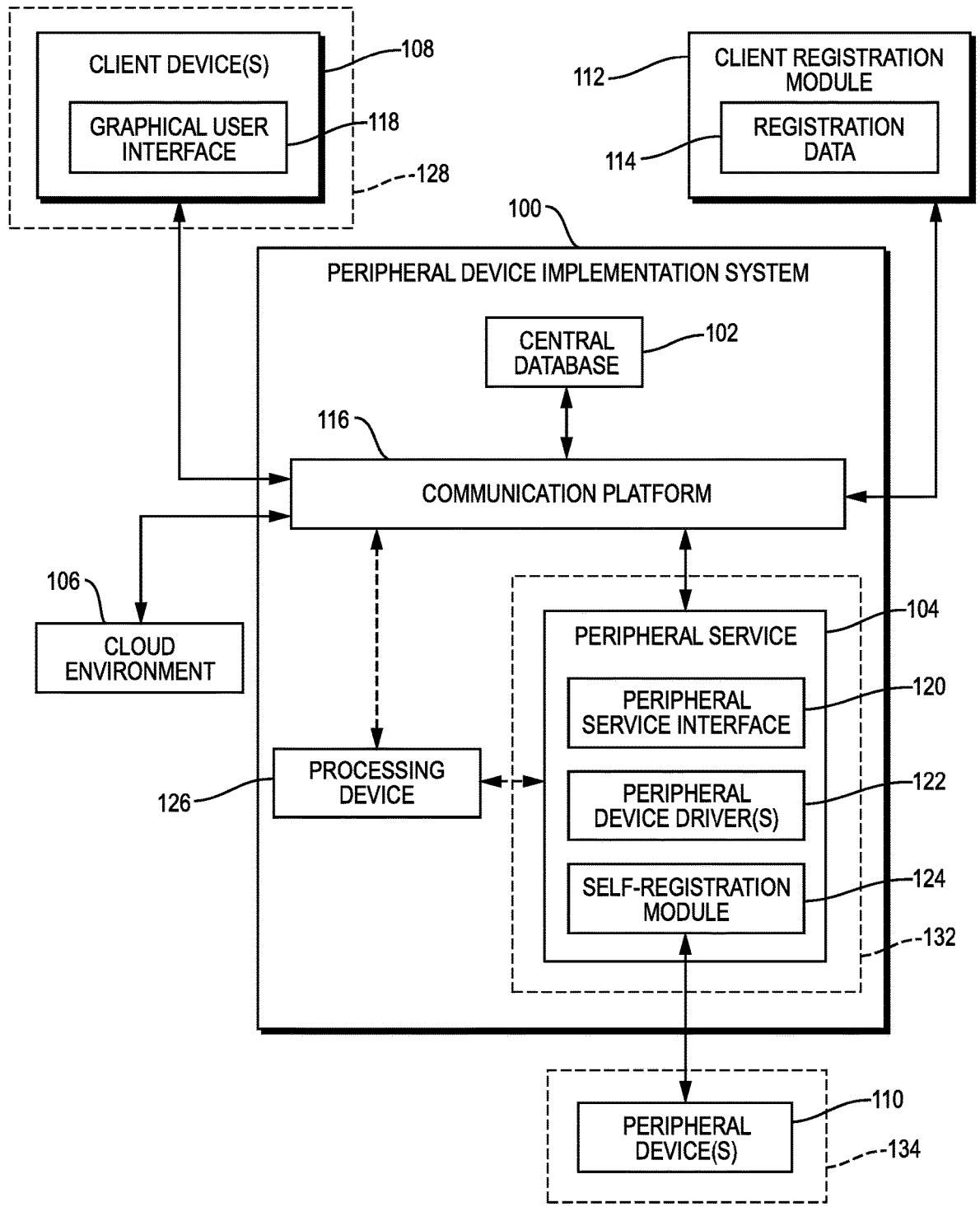
FIG. 1 is a block diagram of an exemplary peripheral device implementation system of the present disclosure.

FIG. 1 is a block diagram of an exemplary peripheral device implementation system 100 (hereinafter "system 100") in accordance with embodiments of the present disclosure. The system 100 generally includes a central database 102, a peripheral service 104, and a communication platform 116. The system 100 can be used to establish communication between one or more client devices 108, one or more peripheral devices 110 and a cloud environment 106 via the communication platform 116. The system 100 can be used to establish communication of the communication platform 116 with a central registration module 112 configured to electronically store registration data 114. The communication platform 116 can establish communication between two or more of the components of the system 100 or components in communication with the system 100. For example, the communication platform 116 can establish communication between the cloud environment 106 and the central database 102, the peripheral service 104, and the client device(s) 108. In some embodiments, the communication platform 116 can be incorporated into a cloud environment 106. In some embodiments, the communication platform 116 can be a separate component from the cloud environment 106 and can be in communication with the cloud environment 106.

The client device(s) 108 can be, e.g., a tablet, a mobile phone, a personal computer, a handheld mobile device, a wearable mobile device, combinations thereof, or the like. Each client device 108 can include a graphical user interface (GUI) 118. The GUI 118 provides an interface for inputting and transmitting data from the client device 108 to components of the system 100 via the communication platform 116. The GUI 118 also provides an interface for receiving transmitted data at the client device 108 from components of the system 100 via the communication platform 116. For example, the GUI 118 can be used to input data into the client device 108, and the data can be electronically transmitted to and stored in the central database 102 via the communication platform 116. As non-limiting examples, the data can include, e.g., a client name, a client password, a client device location, a client address, or the like. Allowing multiple client devices 108 to connect to the system 100 simultaneously permits a plurality of clients and/or retail associates to connect to the system simultaneously to perform functions with the peripheral devices 110, thereby reducing the overall wait time for clients. In some embodiments, the client devices 108 can be, e.g., a personal client device, a device associated with a retail associate, a self-service kiosk located in the peripheral device, or the like.

The peripheral service 104 can include a peripheral service interface 120 configured to establish communication between the peripheral service 104 and the communication platform 116, and between the peripheral service 104 and the peripheral device(s) 110. As non-limiting examples, the peripheral devices 110 can be, e.g., a printer, scanner, camera, combinations thereof, or the like. The peripheral service 104 can include one or more peripheral device drivers 122. Thus, rather than having to download or install peripheral device drivers 122 on the client device(s) 108 for performing functions with the peripheral device(s) 110, the peripheral device drivers 122 can be stored in the peripheral service 104 and the client device(s) 108 can utilize the peripheral device(s) 110 through interaction with the communication platform 116.

The peripheral service 104 can include a self-registration module 124 that can be configured to automatically register a peripheral device 110 being introduced to the system 100 and connected to the peripheral service 104. In some embodiments, the self-registration module 124 can perform the self-registration or authentication process each time the system 100 is initiated from a "sleep" or "off" mode. When a peripheral device 110 is connected to the peripheral service 104, the self-registration module 124 can automatically register (e.g., authenticate) the peripheral device 110 with the cloud environment 106. Self-registration of the peripheral device 110 results in storage of a corresponding driver in the peripheral device drivers 122, as well as data associated with and identifying the peripheral device 110 being stored in the registration data 114 of the central registration module 112. For example, the self-registration module 124 can provide information associated with the name of the peripheral device 110, the status of the peripheral device 110 (e.g., ready to be used, processing data, warming up, or the like), or the like. Upon completing self-registration of the peripheral device 110, the peripheral device 110 can be automatically ready to electronically receive requests to perform functions via the peripheral device 110.

Upon connection of the peripheral device 110, the appropriate data can be transmitted to the peripheral service 104 via the peripheral service interface 120, and can be further transmitted to the central registration module 112 via the communication platform 116. In some embodiments, the peripheral service 104 can monitor and manage technical issues and/or defect resolution associated with the peripheral devices 110. In some embodiments, the peripheral service 104 can transmit peripheral device 110 status or technical issues to the cloud environment 106 for communication to a technical service module (not shown). The system 100 can include one or more processing devices 126 configured to execute instructions stored in a non-transitory computer-readable medium to establish communication and/or data transmission between the components of the system 100.

Thus, the client device(s) 108 and the peripheral device(s) 110 are not directly connected to each other. Rather, the client device(s) and the peripheral device(s) 110 are in communication relative to each other via the peripheral service interface 120 of the peripheral service 104 and the communication platform 116. In particular, the client device(s) 108 are configured to communicate with the cloud environment 106 via the communication platform 116, and the peripheral device(s) 110 are configured to communicate with the cloud environment 106 via the peripheral service interface 120 of the peripheral service 104. In some embodiments, communication between the respective components can be via, e.g., wireless means, wired means, the Internet, the Intranet, alternative network means, combinations thereof, or the like. Layers or degrees of separation therefore exist between the components of the system 100, providing levels of security to protect data transmitted from the client device(s) 108, data stored in databases associated with the cloud environment 106, data stored in the peripheral service 104, data stored on or being processed at the peripheral device(s) 110, combinations thereof, or the like.

In some embodiments, the levels of security can be established by abstraction layers. For example, a first abstraction layer 128 can be associated with the client device(s) 108. It should be understood that abstraction layers also can exist between each of the individual client devices 108 connected to the cloud environment 106. The first abstraction layer 128 therefore maintains the data transmitted to and from the client device 108 confidential relative to the other client devices 108 connected to the system 100. As a further example, a second abstraction layer can be associated with the communication platform 116. As a further example, a third abstraction layer 132 can be associated with the peripheral service 104 (and/or the peripheral service interface 120 of the peripheral service 104). As a further example, a fourth abstraction layer 134 can be associated with the peripheral device(s) 110. It should be understood that abstraction layers can also exist between each of the individual peripheral devices 110. In some embodiments, a separate abstraction layer can be associated with the central database 102 and the central registration module 112. In some embodiments, the second abstraction layer associated with the cloud environment 106 can also be associated with the central database 102 and the central registration module 112.

During implementation of the system 100, a client can connect to the system 100 through a client device 108 to perform a function with a peripheral device 110. For example, if a printer (or a computer connected to the printer) in a retail establishment is not functioning or having technical issues, the client can connect to the system 100 through the client device 108 to perform a printing function through another printer (e.g., the peripheral device 110). Upon connection to the system 100, the client device 108 can be notified by the cloud environment 106 through the communication platform 116 of the peripheral devices 110 available to the client device 108. The client device 108 does not need to download drivers associated with the peripheral devices 110 to the client device 108. In addition, although the client device 108 is notified of the peripheral devices 110 available for use, one or more of the abstraction layers (such as but not limited to abstraction layers 128, 132, 134) can prevent the client device 108 from seeing the functions being performed by the peripheral devices 110. In particular, the abstraction layers (such as but not limited to abstraction layers 128, 132, 134) allow the client to transmit requests to the peripheral service 104 via the communication platform 116, while prevent the client device 108 from visualizing the internal process of the data being transmitted, received, and processed by the peripheral devices 110. Thus, privacy of other clients using the peripheral devices 110 and security of the peripheral devices 110 can be maintained.

The system 100 can provide the client device 108 with a real-time listing of peripheral devices 110 available to the client device 108. In some embodiments, the system 100 can notify the client device 108 of all peripheral devices 110 and their locations available to the client device 108. In some embodiments, the system 100 can limit the peripheral devices 110 provided to the client device 108 as available based on the physical location of the client device 108. For example, the peripheral devices 110 provided to the client device 108 as available for use can be limited based on a physical or geographic distance of the client device 108 relative to the peripheral devices 110 (e.g., a predetermined or selected radius relative to the client device 108, a predetermined or selected distance relative to the client device 108, or the like). As a further example, in some embodiments, the peripheral devices 110 provided to the client device 108 as available for use can be limited based on the structure or building in which the client device 108 is located. In some embodiments, a global positioning system (GPS) incorporated into the client device 108 can notify, via the communication platform 116 to the cloud environment 106, of the physical location of the client device 108 (e.g., within a specific retail establishment). Based on the received GPS information, the system 100, via the communication platform 116 to the cloud environment 106, can limit the peripheral devices 110 available to the client device 108 preferably to the peripheral devices 110 located in or near the same retail establishment as the client device 108.

Upon receiving notification of the peripheral devices 110 available for use, the client can select the appropriate peripheral device 110 via the GUI 118 of the client device 108. For example, a printer can be selected from the list of peripheral devices 110. In some embodiments, the system 100 can allow the client to limit the list of peripheral devices based on the type of peripheral device 110 (e.g., a printer, a scanner, a camera, or the like). From the narrowed list, the system 100 can allow the client to select the desired peripheral device 110. The client device 108 can be actuated to electronically transmit a first request from the client device 108 to the cloud environment 106 via the communication platform 116 regarding performing a function with the peripheral device 110. For example, the client device 108 can transmit a document or an image to be printed from the client device 108 to the cloud environment 106 via the communication platform 116 such that the function of printing the document or image can be performed at the selected peripheral device 110.

The request can be processed and electronically transmitted from the cloud environment 106 to the peripheral service 104 via communication between the communication platform 116 and the peripheral service interface 120. The peripheral service 104 can, in turn, process and electronically transmit the request to the selected peripheral device 110 via the communication with the peripheral service interface 120 to initiate performing the function (e.g., printing) with the selected peripheral service interface 120. In particular, the peripheral service interface 120 interacts with the selected peripheral device 110 by providing the necessary peripheral device driver 122 such that the request can be processed by the peripheral device 110. The request from the client device 108 can thereby be processed by any peripheral device 110 available through the cloud environment 106 without need for the client device 108 to be hardwired to the peripheral device 110. In particular, if a peripheral device 110 is not functioning properly in the retail establishment, an alternative peripheral device 110 can be implemented for performing the desired function without having the client wait until the original peripheral device 110 is fixed. Similarly, a client can remotely transmit a request to a peripheral device 110 at the retail establishment prior to traveling to the retail establishment, such that when the client arrives at the retail establishment at a future time, the peripheral device 110 has already performed the requested function.

Figure 2:
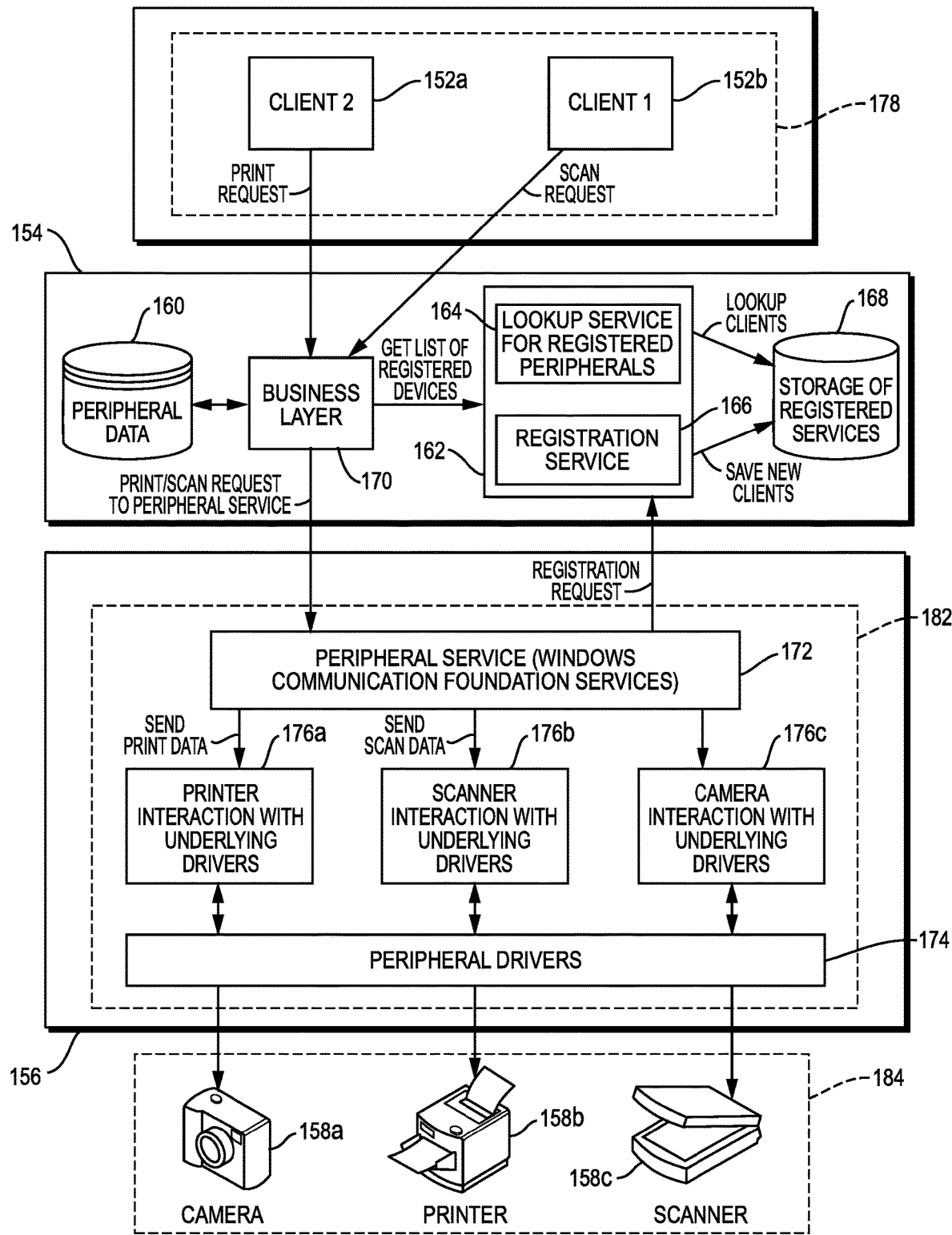
FIG. 2 is a block diagram of an exemplary peripheral device implementation of the present disclosure.

FIG. 2 is a block diagram of an exemplary peripheral device implementation according to embodiments of the present disclosure. Communication can be established between one or more client devices 152a, 152b, a cloud environment 154, a peripheral service 156 and one or more peripheral devices 158a-c. The cloud environment 154 can include a database 160 configured to electronically store data relating to clients and/or client devices 152a, 152b. The cloud environment 154 can include a central registration module 162 configured to receive and process data associated with peripheral devices 158a-c registered with the cloud environment 154.

The registration module 162 can include a query module 164 that electronically receives a request from a client device 152a, 152b regarding available peripheral devices 158a-c connected to the cloud environment 154 and ready for use by the client. The query module 164 queries a registration database 168 to determine the available peripheral devices 158a-c to be provided to the client device 152a, 152b. The registration module 162 can include a registration interface 166 configured to receive data from peripheral devices 158a-c (e.g., self-registration or self-authentication) in communication with the cloud environment 154, and transmit the data to the registration database 168 for storage. The cloud environment 154 can further include a communication platform 170 configured to provide communication between the client devices 152a, 152b and components of the cloud environment 154.

The peripheral service 156 can include a peripheral service interface 172 configured to provide communication between the cloud environment 154 and the peripheral devices 158a-c. The peripheral service 156 can include peripheral device drivers 172 such that the client devices 152a, 152b can utilize the peripheral devices 158a-c without having to download or install drivers onto the client devices 152a, 152b. In some embodiments, the peripheral service interface 172 can include individual sub-interfaces 176a-c configured to provide communication between the cloud environment 154 and specific types of peripheral devices 158a-c. For example, a printer sub-interface 176a can be configured to provide communication between the cloud environment 154 and a printer peripheral device 158b, a scanner sub-interface 176b can be configured to provide communication between the cloud environment 154 and a scanner peripheral device 158c, and a camera sub-interface 176c can be configured to provide communication between the cloud environment 154 and a camera peripheral device 158a.

In some embodiments, a first abstraction layer 178 can be associated with each of the client devices 152a, 152b. In some embodiments, a second abstraction layer can be associated with the communication platform 170 of the cloud environment. In some embodiments, a third abstraction layer 182 can be associated with the peripheral service 156. In some embodiments, a fourth abstraction layer 184 can be associated with each of the peripheral devices 158a-c. The abstraction layers 178-184 provide separation between components of the system 100, thereby allowing levels of security to be established between each of the components of the system 100.

Figure 3:
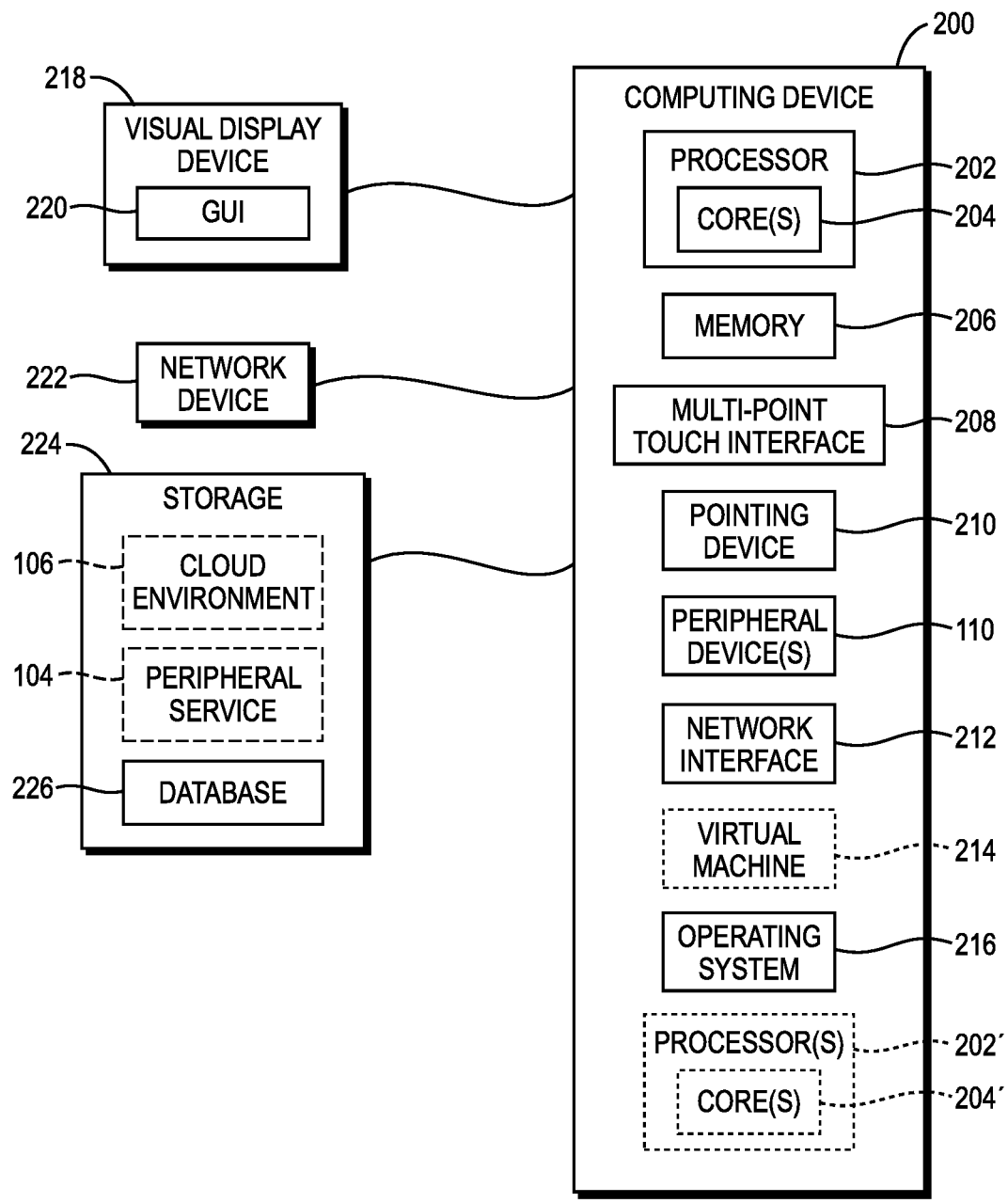
FIG. 3 is a block diagram of a computing device in accordance with exemplary embodiments of the present disclosure.

FIG. 3 is a block diagram of a computing device 200 in accordance with exemplary embodiments of the present disclosure. The computing device 200 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 206 included in the computing device 200 may store computer-readable and computer-executable instructions or software for implementing exemplary embodiments of the present disclosure (e.g., the communication platform 116, the peripheral service 104, the peripheral service interface 120, the self-registration module 124, or the like). The computing device 200 also includes configurable and/or programmable processor 202 and associated core 204, and optionally, one or more additional configurable and/or programmable processor(s) 202' and associated core(s) 204' (for example, in the case of computer systems having multiple processors/cores), for executing computer-readable and computer-executable instructions or software stored in the memory 206 and other programs for controlling system hardware. Processor 202 and processor(s) 202' may each be a single core processor or multiple core (204 and 204') processor.

Virtualization may be employed in the computing device 200 so that infrastructure and resources in the computing device 200 may be shared dynamically. A virtual machine 214 may be provided to handle a process running on multiple processors so that the process appears to be using only one computing resource rather than multiple computing resources. Multiple virtual machines may also be used with one processor.

Memory 206 may include a computer system memory or random access memory, such as DRAM, SRAM, EDO RAM, and the like. Memory 206 may include other types of memory as well, or combinations thereof.

A user may interact with the computing device 200 through a visual display device 218 (e.g., a client device 108), such as a computer monitor, which may display one or more user interfaces 220 (e.g., GUI 118) that may be provided in accordance with exemplary embodiments. The computing device 200 may include other I/O devices for receiving input from a user, for example, a keyboard or any suitable multi-point touch interface 208, a pointing device 210 (e.g., a mouse). The keyboard 208 and the pointing device 210 may be coupled to the visual display device 218. The computing device 200 may include other suitable conventional I/O peripherals.

The computing device 200 may also include one or more storage devices 224, such as a hard-drive, CD-ROM, or other computer readable media, for storing data and computer-readable instructions and/or software that implement exemplary embodiments of the cloud environment 106, the peripheral service 104, combinations thereof, or the like, described herein. Exemplary storage device 224 may also store one or more databases 226 for storing any suitable information required to implement exemplary embodiments. For example, exemplary storage device 224 can store one or more databases 226 for storing information, such as data for clients, registration data 114 for the peripheral devices 110, or the like, and computer-readable instructions and/or software that implement exemplary embodiments described herein. The databases 226 may be updated by manually or automatically at any suitable time to add, delete, and/or update one or more items in the databases.

The computing device 200 can include a network interface 212 configured to interface via one or more network devices 222 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 212 may include a built-in network adapter, network interface card, PCMCIA network card, card bus network adapter, wireless network adapter, USB network adapter, modem or any other device suitable for interfacing the computing device 200 to any type of network capable of communication and performing the operations described herein. Moreover, the computing device 200 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 200 may run any operating system 216, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 216 may be run in native mode or emulated mode. In an exemplary embodiment, the operating system 216 may be run on one or more cloud machine instances.

Figure 4:
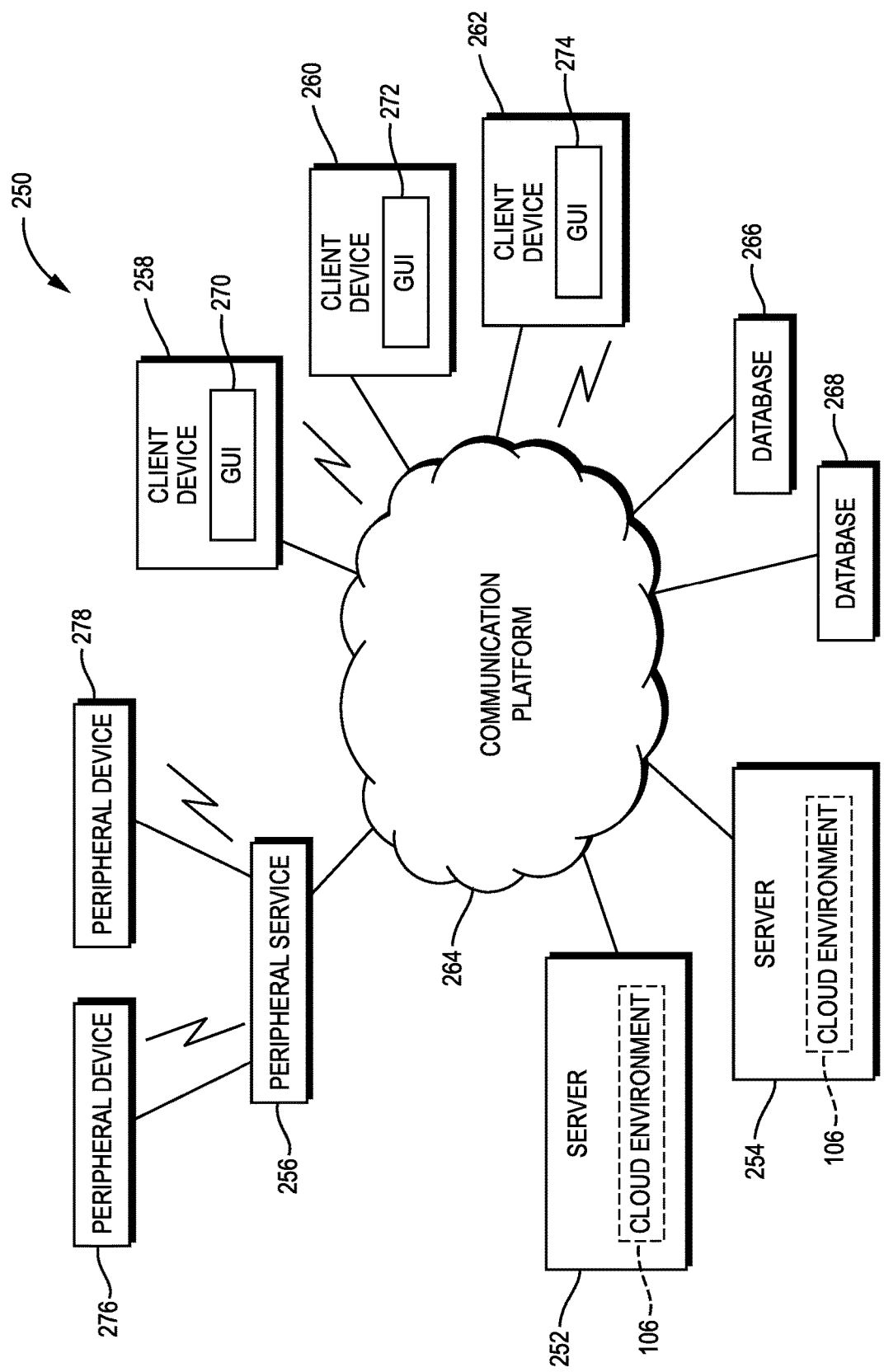
FIG. 4 is a block diagram of an exemplary peripheral device implementation system environment in accordance with embodiments of the present disclosure.

FIG. 4 is a block diagram of an exemplary peripheral device implementation system environment 250 in accordance with exemplary embodiments of the present disclosure. The environment 250 can include servers 252, 254 operatively coupled to a peripheral service 256, and client devices 258-262, via a communication platform 264, which can be any network over which information can be transmitted between devices communicatively coupled to the network. For example, the communication platform 264 can be the Internet, Intranet, virtual private network (VPN), wide area network (WAN), local area network (LAN), and the like. In some embodiments, the communication platform 264 can be part of a cloud environment (e.g., the cloud environment 106). The environment 250 can include repositories or databases 266, 268, which can be operatively coupled to the servers 252, 254, as well as to the client devices 2258-262 and the peripheral service 256, via the communications platform 264. In exemplary embodiments, the servers 252, 254, peripheral service 256, client devices 258-262 and the databases 266, 268 can be implemented as computing devices (e.g., computing device 200). Those skilled in the art will recognize that the databases 266, 268 can be incorporated into one or more of the servers 252, 254 such that one or more of the servers 252, 254 can include databases 266, 268. The database 266 can be the central database 102 storing client data. The database 268 can be the central registration module 112 storing registration data 114.

In some embodiments, embodiments of the servers 252, 254 can be configured to implement one or more portions of the cloud environment 116. Each of the client devices 258-262 can include graphical user interfaces 270-274 (e.g., GUI 118) configured to allow for communication between the client device 158-162 and the communication platform 264. The environment 250 can include peripheral devices 276, 278 in communication with the peripheral service 256. A peripheral service interface of the peripheral service 256 can provide an interface for communication between the peripheral devices 276, 278 and the communication platform 264.

Figure 5:
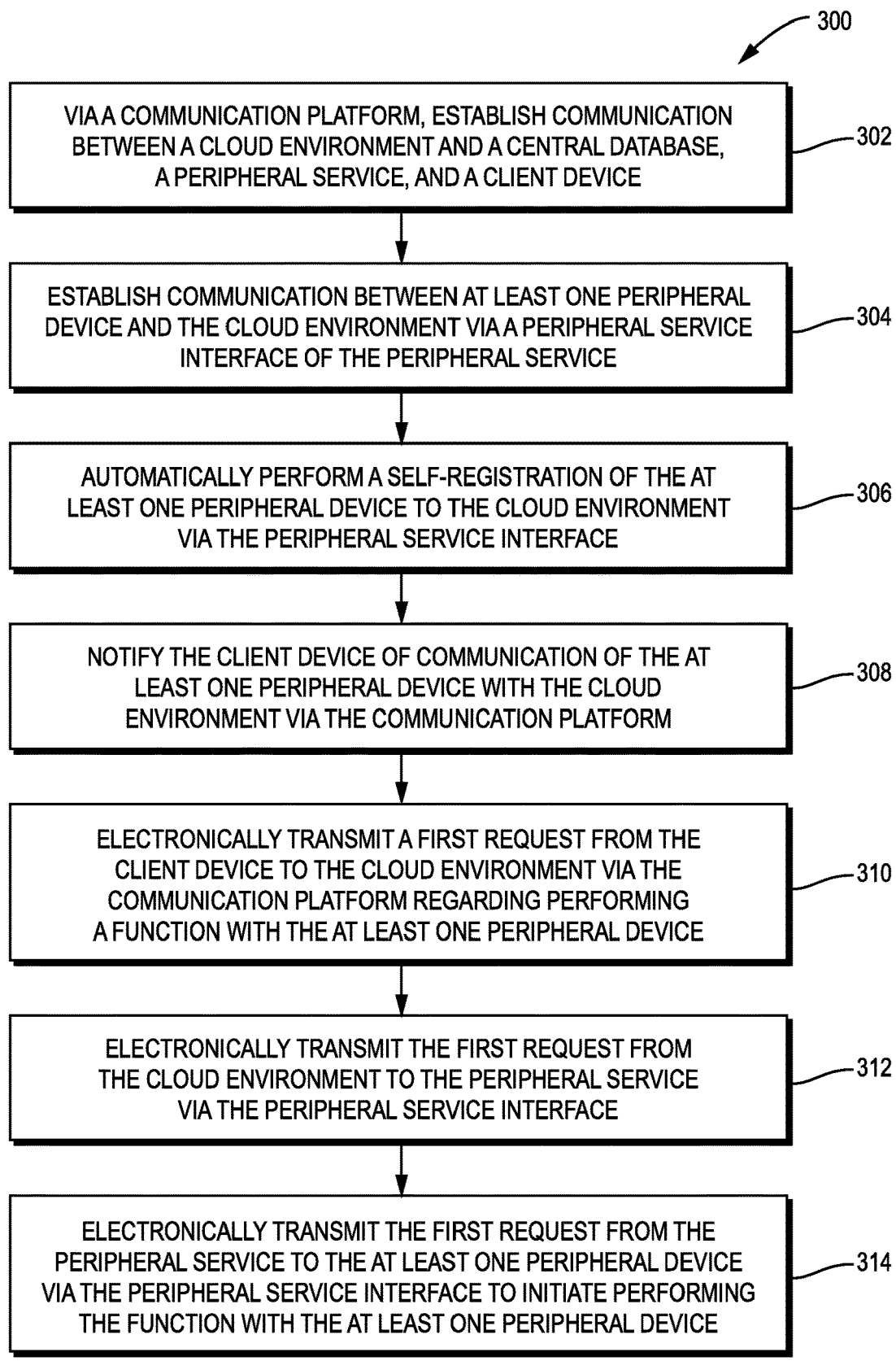
FIG. 5 is a flowchart illustrating an implementation of an exemplary peripheral device implementation system in accordance with embodiments of the present disclosure.

FIG. 5 is a flowchart illustrating an exemplary process 300 as implemented by the peripheral device implementation system. To begin, at step 302, communication can be established between a cloud environment and a central database, a peripheral service and a client device via a communication platform. At step 304, communication can be established between at least one peripheral device and the cloud environment via a peripheral service interface of the peripheral service. At step 306, a self-registration of the at least one peripheral device to the cloud environment can be automatically performed via the peripheral service interface.

At step 308, the client device can be notified of communication of the at least one peripheral device with the cloud environment via the communication platform. At step 310, a first request can be electronically transmitted from the client device to the cloud environment via the communication platform regarding performing a function with the at least one peripheral device. At step 312, the first request can be electronically transmitted from the cloud environment to the peripheral service via the peripheral service interface. At step 314, the first request can be electronically transmitted from the peripheral service to the at least one peripheral device via the peripheral service interface to initiate performing the function with the at least one peripheral device.

FIGS. 6-10 are non-limiting example graphical user interfaces at a client device for performing a printing function at a peripheral device. Although showing a process for printing via a peripheral device, it should be understood that a substantially similar interface can be provided for capturing a photograph and/or scanning a document via a peripheral device. In some embodiments, the client can scan or photograph a document via the client device, and can further implement a graphical user interface of the system to transmit and print the document at a peripheral device associated with the retail establishment.

Figure 6:
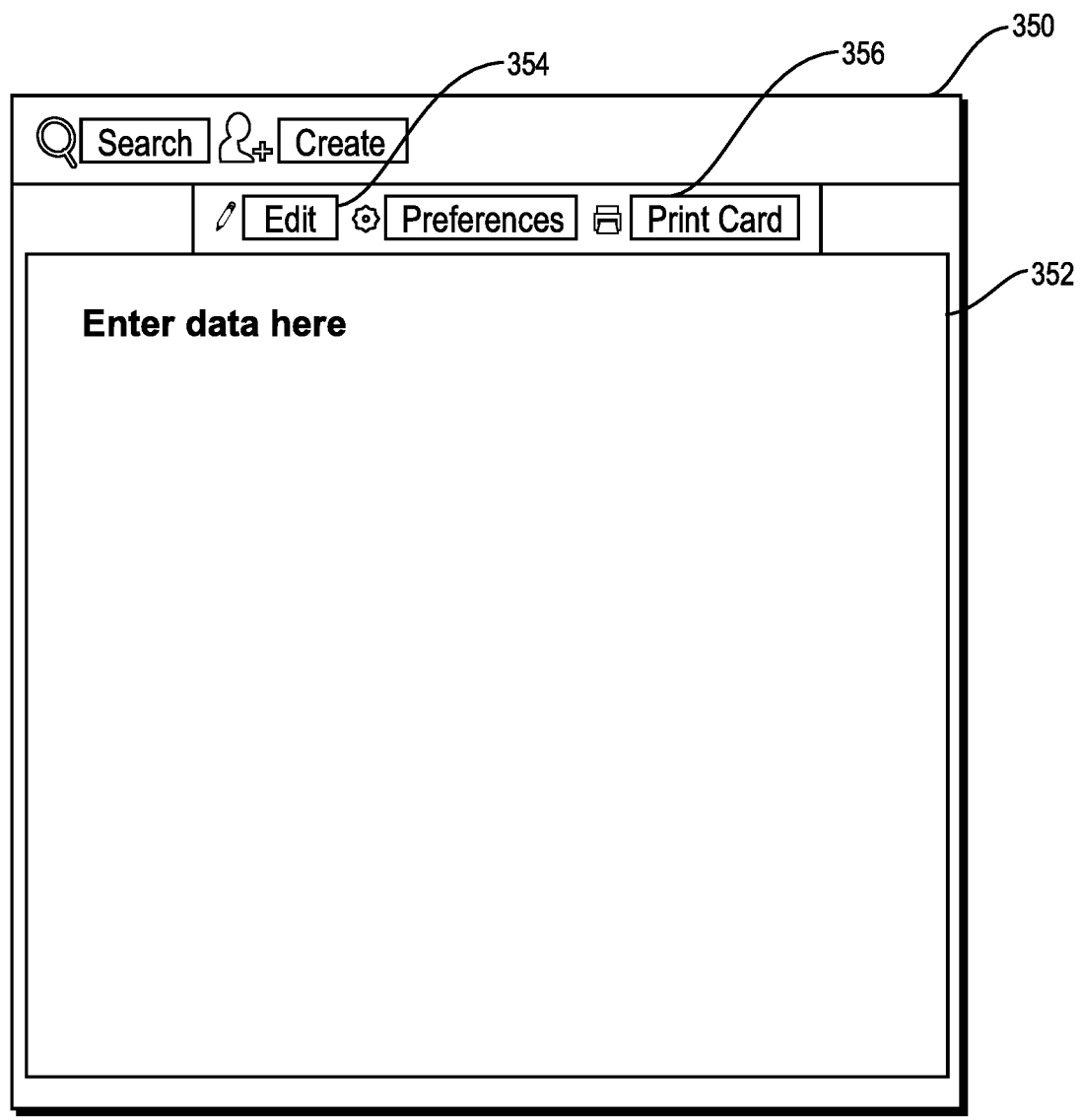
FIG. 6 is an exemplary graphical user interface at a client device including printable data in accordance with embodiments of the present disclosure.

FIG. 6 shows an example graphical user interface (GUI) 350 in which the user can verify and update data to be sent to the peripheral device at a window 352 (such as but not limited to data to be printed). The client can log in to the GUI 350 via the client device to access the data window 352. Connecting to the GUI 350 results in the client device establishing communication with the cloud environment. The GUI 350 can include an edit button 354 that can be actuated to edit the data within the data window 352. The GUI 350 can include a print button 356 that can be actuated to print data at a peripheral device.

Figure 7:
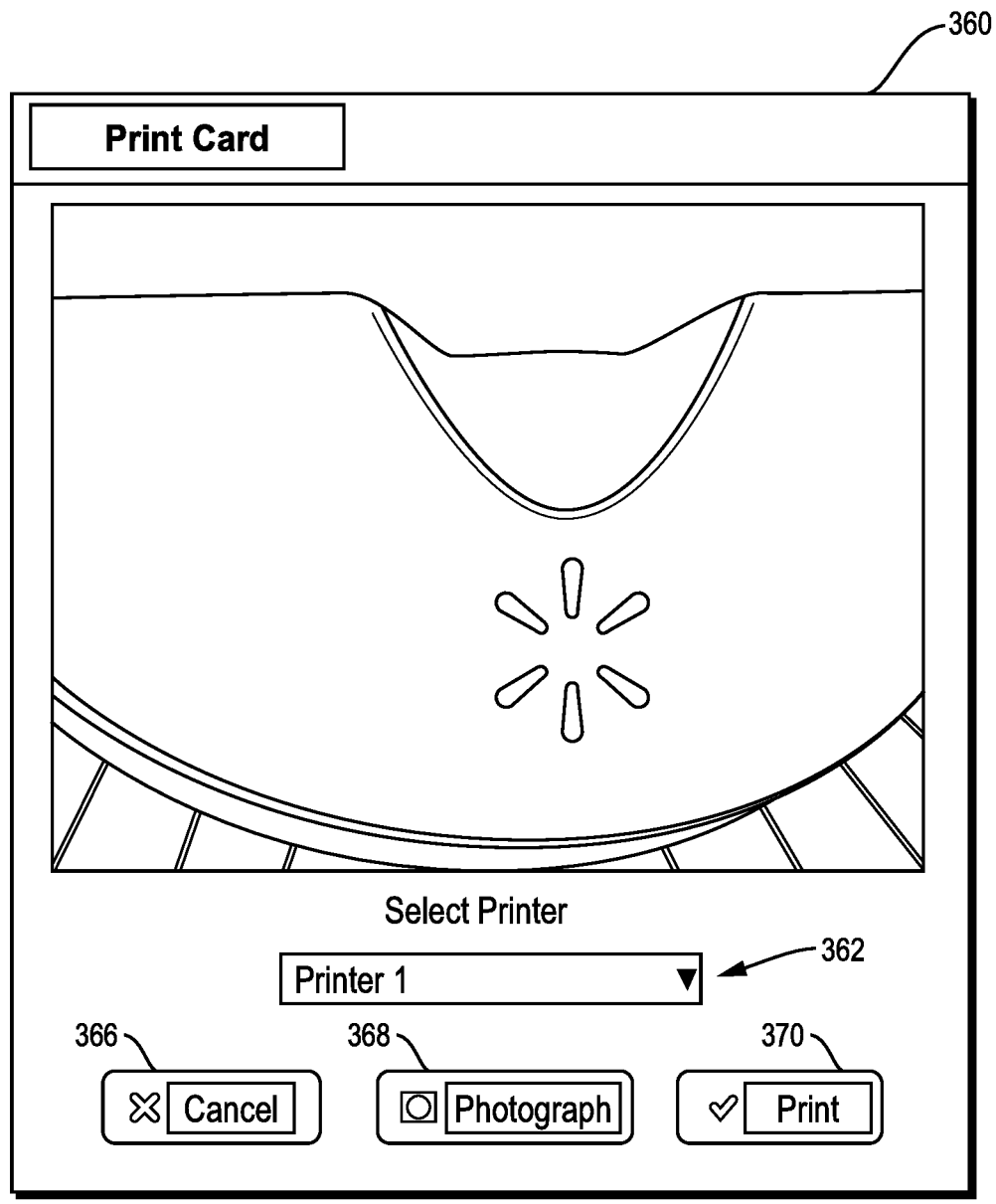
FIG. 7 is an exemplary graphical user interface at a client device including a peripheral device selection in accordance with embodiments of the present disclosure.
Figure 8:
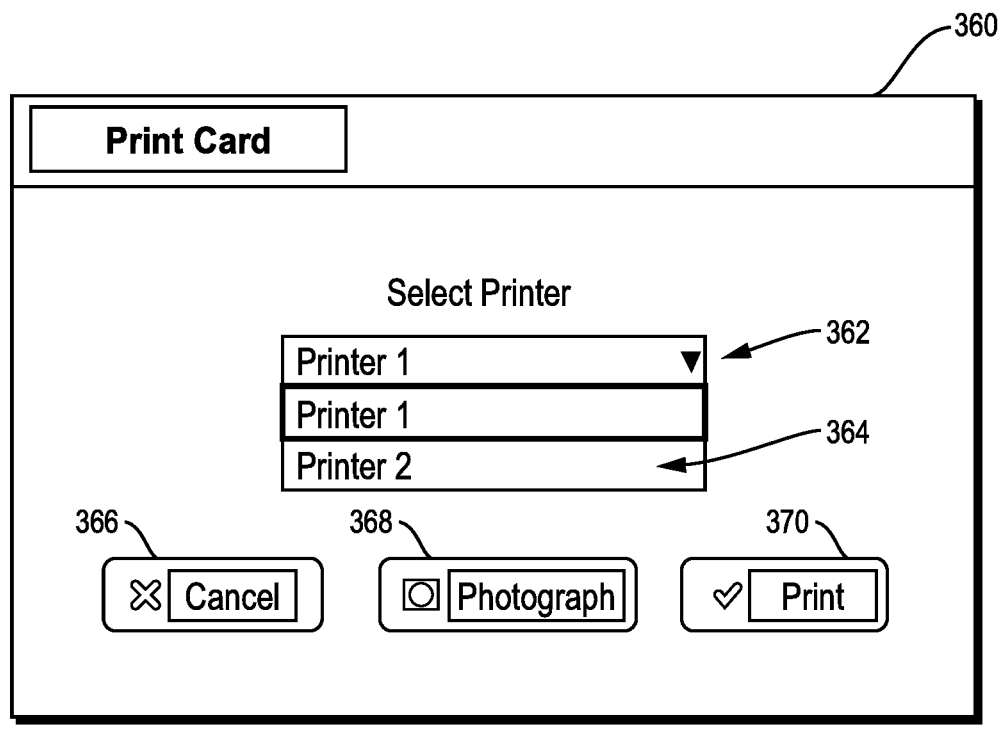
FIG. 8 is an exemplary graphical user interface at a client device including a number of peripheral devices for selection by a client in accordance with embodiments of the present disclosure.

FIG. 7 is an example graphical user interface (GUI) 360 including a peripheral device selection 362. In particular, if the print button 356 is actuated in the GUI 350, the client can be directed to the GUI 360 for selecting the peripheral device selection 362 (e.g., a drop down menu). In addition, actuating the print button 356 can connect the client device to the cloud environment to query and provide a real-time list of peripheral devices available for use by the client. FIG. 8 shows the example GUI 360 with a list 364 of peripheral devices expanded for selection by the client. The GUI 360 includes a cancel button 366, a photograph button 368, and a print button 370. Actuating the cancel button 366 can terminate the transaction.

Figure 9:
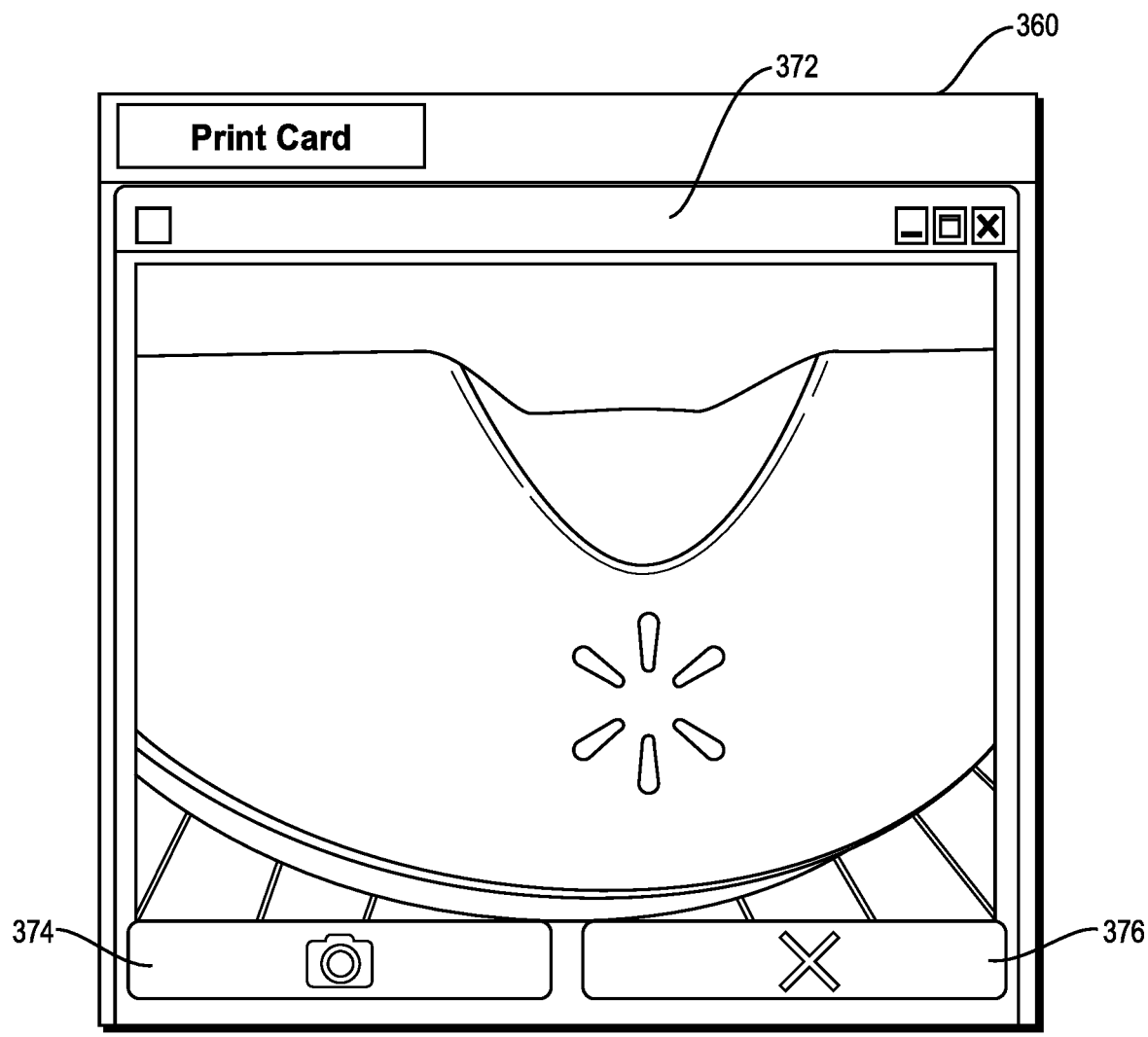
FIG. 9 is an exemplary graphical user interface at a client device including a camera feed window for capture of a client image in accordance with embodiments of the present disclosure.

Actuating the photograph button 368 can establish connection of the client device with a camera to capture data such as an image or other data. FIG. 9 shows the example GUI 360 including a live camera feed window 372 to which the client is directed upon actuation of the photograph button 368. The client can utilize the window 372 to capture data such as an image (or other data) to be printed via the peripheral device. The window 372 includes a capture button 374 and a cancel button 376. The capture button 374 can be actuated to capture an image with the camera via the window 374.

Figure 10:
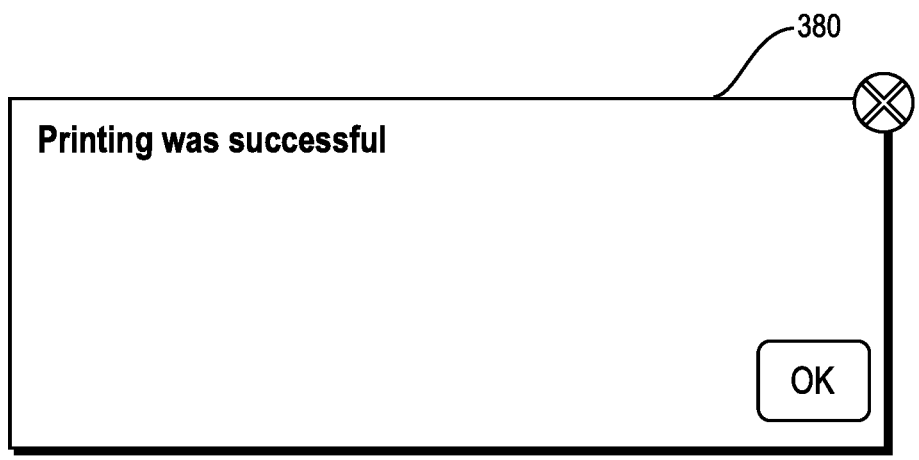
FIG. 10 is an exemplary graphical user interface at a client device including a confirmation window regarding performing a function at a peripheral device in accordance with embodiments of the present disclosure.

After the desired image is captured, the client can actuate the print button 370. Actuating the print button 370 electronically transmit the request to print the data to the cloud environment. The cloud environment can, in turn, electronically transmit the request to print the data to the peripheral service. The peripheral service can, in turn, electronically transmit the request to print the data to the selected peripheral device. FIG. 10 shows an example confirmation window 380. Upon successful printing of the transmitted data, the confirmation window 380 can be displayed to the client on the client device, indicating that the peripheral device has received and processed the transmitted request from the client device.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A peripheral device implementation system, comprising:
   a central database;
   a peripheral service including a peripheral service interface;
   a communication platform;
   a non-transitory computer-readable medium; and
   a processing device, wherein the processing device is configured to execute instructions stored in the non-transitory computer-readable medium to:
      via the communication platform, establish communication between a cloud environment and the central database, the peripheral service, and a client device;
      establish communication between two or more peripheral devices and the cloud environment via the peripheral service interface, and automatically perform a self-registration of the two or more peripheral devices to the cloud environment via the peripheral service interface upon initial introduction of the two or more peripheral devices to the peripheral device implementation system;
      notify the client device of communication of the two or more peripheral devices with the cloud environment via the communication platform;
      receive as input on the client device a type of peripheral device to electronically receive a first request from the client device to the cloud environment via the communication platform regarding performing a function with one of the two or more peripheral devices, the type of peripheral device selected from a group consisting of a printer, a scanner, and a camera;
      limit the two or more peripheral devices in communication with the cloud environment based on the type of peripheral device input on the client device;
      provide the client device with a list of one or more peripheral devices limited to the type of peripheral device input on the client device and in communication with the cloud environment;
      provide as input on the client device a selected peripheral device from the list of one or more peripheral devices limited to the type of peripheral device input on the client device and in communication with the cloud environment;
      electronically transmit the first request from the client device to the cloud environment via the communication platform regarding performing the function with the selected peripheral device;
      electronically transmit the first request from the cloud environment to the selected peripheral service via the peripheral service interface;
      electronically transmit the first request from the peripheral service to the selected peripheral device via the peripheral service interface to initiate performing the function with the selected peripheral device; and
      automatically perform a subsequent self-registration of the two or more peripheral devices to the cloud environment via the peripheral service interface upon initiation of the peripheral device implementation system from a sleep or off mode,
      wherein upon automatically performing the self-registration or the subsequent self-registration of the two or more peripheral devices to the cloud environment, the two or more peripheral device become automatically available to the client device in communication with the cloud environment to receive the first request from the client device via the cloud environment.

2. The peripheral device implementation system of claim 1, wherein the communication platform is configured to provide communication between the client device and the selected peripheral device without loading a driver of the selected peripheral device to the client device or the cloud environment.

3. The peripheral device implementation system of claim 1, wherein the client device is at least one of: a tablet, a mobile phone, a personal computer, a handheld mobile device, or a wearable mobile device.

4. The peripheral device implementation system of claim 1, wherein the processing device is further configured to execute instructions stored in the non-transitory computer-readable medium to electronically store to the central database data associated with the client device.

5. The peripheral device implementation system of claim 1, wherein the processing device is further configured to execute instructions stored in the non-transitory computer-readable medium to store registration data associated with the two or more peripheral devices in a central registration module, the central registration module being connected to the cloud environment via the communication platform.

6. The peripheral device implementation system of claim 1, wherein the processing device is further configured to execute instructions stored in the non-transitory computer-readable medium to associate a first abstraction layer with the client device.

7. The peripheral device implementation system of claim 6, wherein the processing device is further configured to execute instructions stored in the non-transitory computer-readable medium to associate a second abstraction layer with the communication platform of the cloud environment.

8. The peripheral device implementation system of claim 7, wherein the processing device is further configured to execute instructions stored in the non-transitory computer-readable medium to associate a third abstraction layer with the peripheral service interface of the peripheral service.

9. The peripheral device implementation system of claim 8, wherein the processing device is further configured to execute instructions stored in the non-transitory computer-readable medium to associate a fourth abstraction layer with the two or more peripheral devices.

10. The peripheral device implementation system of claim 9, wherein the first, second, third and fourth abstraction layers provide levels of security between the client device, the communication platform of the cloud environment, the peripheral service interface of the peripheral service, and the two or more peripheral devices.

11. The peripheral device implementation system of claim 1, wherein the processing device is further configured to execute instructions stored in the non-transitory computer-readable medium to notify the client device of additional peripheral devices communicating with the cloud environment via the communication platform.

12. The peripheral device implementation system of claim 11, wherein the processing device is further configured to execute instructions stored in the non-transitory computer-readable medium to limit the additional peripheral devices provided to the client device as communicating with the cloud environment based on a client device location.

13. The peripheral device implementation system of claim 12, wherein the client device location is limited by a distance of the client device relative to the additional peripheral devices, or a structure in which the client device is located.

14. The peripheral device implementation system of claim 12, wherein the processing device is further configured to execute instructions stored in the non-transitory computer-readable medium to communicate driver information associated with the selected peripheral device between the selected peripheral device and the client device via communication between the peripheral service interface and the cloud environment, and via communication between the communication platform of the cloud environment and the client device.

15. A non-transitory computer-readable medium storing instructions that are executable by a processing device, wherein execution of the instructions by the processing device causes the processing device to:
via a communication platform, establish communication between a cloud environment and a central database, a peripheral service, and a client device of a peripheral device implementation system;
establish communication between two or more peripheral devices and the cloud environment via a peripheral service interface of the peripheral service, and automatically perform a self-registration of the two or more peripheral devices to the cloud environment via the peripheral service interface upon initial introduction of the two or more peripheral devices to the peripheral device implementation system;
notify the client device of communication of the two or more peripheral devices with the cloud environment via the communication platform;
receive as input on the client device a type of peripheral device to electronically receive a first request from the client device to the cloud environment via the communication platform regarding performing a function with one of the two or more peripheral devices, the type of peripheral device selected from a group consisting of a printer, a scanner, and a camera;
limit the two or more peripheral devices in communication with the cloud environment based on the type of peripheral device input on the client device;
provide the client device with a list of one or more peripheral devices limited to the type of peripheral device input on the client device and in communication with the cloud environment;
provide as input on the client device a selected peripheral device from the list of one or more peripheral devices limited to the type of peripheral device input on the client device and in communication with the cloud environment;
electronically transmit the first request from the client device to the cloud environment via the communication platform regarding performing the function with the selected peripheral device;
electronically transmit the first request from the cloud environment to the peripheral service via the peripheral service interface;
electronically transmit the first request from the peripheral service to the selected peripheral device via the peripheral service interface to initiate performing the function with the selected peripheral device; and
automatically perform a subsequent self-registration of the two or more peripheral devices to the cloud environment via the peripheral service interface upon initiation of the peripheral device implementation system from a sleep or off mode,
wherein upon automatically performing the self-registration of the two or more peripheral devices to the cloud environment, the two or more peripheral device become automatically available to the client device in communication with the cloud environment to receive the first request from the client device via the cloud environment.

16. The medium of claim 15, wherein the communication platform is configured to provide communication between the client device and the selected peripheral device without loading a driver of the selected peripheral device to the client device or the cloud environment.

17. The medium of claim 15, wherein execution of the instructions by the processing device causes the processing device to associate an abstraction layer with at least one of the client device, the cloud environment, the peripheral service interface, or the two or more peripheral devices.

18. A method of implementing peripheral devices, comprising:
via a communication platform, establishing communication between a cloud environment and a central database, a peripheral service, and a client device of a peripheral device implementation system;
establishing communication between two or more peripheral devices and the cloud environment via a peripheral service interface of the peripheral service, and automatically performing a self-registration of the two or more peripheral devices to the cloud environment via the peripheral service interface upon initial introduction of the two or more peripheral devices to the peripheral device implementation system;
notifying the client device of communication of the two or more peripheral devices with the cloud environment via the communication platform;
receiving as input on the client device a type of peripheral device to electronically receive a first request from the client device to the cloud environment via the communication platform regarding performing a function with one of the two or more peripheral devices, the type of peripheral device selected from a group consisting of a printer, a scanner, and a camera;
limiting the two or more peripheral devices in communication with the cloud environment based on the type of peripheral device input on the client device;
providing the client device with a list of one or more peripheral devices limited to the type of peripheral device input on the client device and in communication with the cloud environment;

providing as input on the client device a selected peripheral device from the list of one or more peripheral devices limited to the type of peripheral device input on the client device and in communication with the cloud environment;

electronically transmitting the first request from the client device to the cloud environment via the communication platform regarding performing the function with the selected peripheral device;

electronically transmitting the first request from the cloud environment to the peripheral service via the peripheral service interface;

electronically transmitting the first request from the peripheral service to the selected peripheral device via the peripheral service interface to initiate performing the function with the selected peripheral device; and automatically performing a subsequent self-registration of the two or more peripheral devices to the cloud environment via the peripheral service interface upon initiation of the peripheral device implementation system from a sleep or off mode, wherein upon automatically performing the self-registration of the two or more peripheral devices to the cloud environment, the two or more peripheral device become automatically available to the client device in communication with the cloud environment to receive the first request from the client device via the cloud environment.

* * * * *